United States Patent [19]

Gagliani et al.

[11] Patent Number: 4,600,770
[45] Date of Patent: Jul. 15, 1986

[54] WATER SOLUBLE IMIDE COATING COMPOSITION AND METHOD OF MAKING FROM LACTAM, DIANHYDRIDE AND DIAMINE

[76] Inventors: John Gagliani, 6280 Lance Pl., San Diego, Calif. 92120; John V. Long, 1756 E. Lexington Ave., El Cajon, Calif. 92021

[21] Appl. No.: 694,095

[22] Filed: Jan. 23, 1985

[51] Int. Cl.$^4$ .................. C08G 69/14; C08G 73/10
[52] U.S. Cl. ........................ 528/322; 524/366; 524/376; 524/378; 524/592; 524/600; 524/611; 528/179; 528/182; 528/188; 528/189; 528/222; 528/224; 528/229; 528/315; 528/317; 528/318; 528/321; 528/323
[58] Field of Search ............... 528/322, 324, 179, 182, 528/188, 189, 222, 224, 229, 315, 317, 318, 321, 323; 524/592, 600, 611, 366, 376, 378

[56] References Cited

U.S. PATENT DOCUMENTS

| | | | |
|---|---|---|---|
| 4,183,838 | 1/1980 | Gagliani | 528/322 |
| 4,183,839 | 1/1980 | Gagliani | 528/322 |
| 4,442,283 | 4/1984 | Gagliani et al. | 528/324 |

*Primary Examiner*—Harold D. Anderson
*Attorney, Agent, or Firm*—Frank D. Gilliam

[57] ABSTRACT

Methods of making water soluble polyimide resin compositions. A carboxy terminated bisimide is prepared by reacting a suitable aromatic dianhydride with a suitable oxoimine. The bisimide is then mixed with a sufficient quantity of a water soluble solvent to dissolve the bisimide. Water is added to make a solution of the desired viscosity. An aromatic diamine is added to this water solution. To the mixture is added a suitable quantity of a tertiary amine to stabilize the resin. The solution is coated onto a surface and dried to produce a smooth, flexible coating. The coating can then be heated to an appropriate temperature to produce a fully polymerized coating which is thermally stable and resistant to oils and solvents.

20 Claims, No Drawings

WATER SOLUBLE IMIDE COATING COMPOSITION AND METHOD OF MAKING FROM LACTAM, DIANHYDRIDE AND DIAMINE

BACKGROUND OF THE INVENTION

This invention relates in general to polyimide resins and, more specifically, to stable, water soluble polyimide coating compositions and methods for making them.

Prior U.S. Pat. Nos. 4,161,477, 4,183,838, 4,183,839 and 4,442,283 disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxoimine.

The polyimide forming material is then prepared by dissolving the bisimide in an organic solvent, such as an aliphatic alcohol; then adding thereto a suitable diamine, producing a viscous fluid containing an intimate, unpolymerized mixture of N-substituted cyclic bisimide dicarboxylic acid and diamine which is capable of being converted to a high molecular weight polymer by the application of heat.

The solution diluted to a suitable viscosity with an organic solvent is coated onto a surface, dried and polymerized by heating to a temperature in the 177°–316° C. range for 30 minutes to 5 hours. The resulting coating is tough and highly adherent to various surfaces. It has excellent peel strength and is resistant to high temperatures, peeling and abrasion.

The prior coating material, however, was not fully satisfactory for many applications. Often the prior coating compositions required the addition of flow control or wetting agents in order to have satisfactory coating characteristics. The organic solvents used in the prior coating compositions were very flammable, requiring special shipping containers and solvent recovery facilities while drying the coating to meet air quality standards. Long term storage was sometimes not practical due to danger of viscosity changes or gellation.

Thus, there is a continuing need for improved polyimide coating compositions having a better combination of long-term storage capability, improved wetting characteristics, and/or flammability.

SUMMARY OF THE INVENTION

By making certain changes in the compositions and methods described in the above-referenced prior patents, we have found that a polyimide coating and adhesive can be made which overcomes the problems noted above.

Out improved coating and adhesive is made, basically, by the steps of reacting a suitable aromatic dianhydride with a suitable oxoimine with heat to produce a carboxy terminated bisimide, dissolving the reaction product in a water soluble solvent adding a suitable quantity of water, adding a suitable diamine and any desired additives, coating the resulting liquid onto the surface to be coated, and drying and curing the coating or adhesive at an elevated temperature.

A tough, flexible and substantially defect-free coating results.

DETAILED DESCRIPTION OF THE INVENTION

Any suitable aromatic dianhydrides may be used in the preparation of the desired copolymers. Typical dianhydrides include those described in U.S. Pat. Nos. 3,282,897, issued Nov. 1, 1966 and 3,310,506, issued Mar. 21, 1967 and those included in the above-cited patents. Due to their ready availability at reasonable prices and the excellent coating which result, the preferred aromatic dianhydrides are pyromellitic dianhydride and 3,3',4,4'-benzophenone tetracarboxylic acid dianhydride (BTDA). If desired, a portion of an aliphatic dianhydride such as 1,2,3,4-butanetetracarboxylic acid dianhydride (BTCD) may be used. Generally, at least about 0.5 mole % dianhydride should be an aromatic dianhydride.

Any suitable oxoimine may be reacted with the selected dianhydride to produce the desired imide. Preferably, the oxoimine has the general formula:

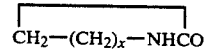

where "x" is a positive integer from 4 to 7. Of these, best results are obtained with caprolactam.

While any suitable reaction conditions may be used, we have obtained excellent results where the dianhydride is added to the oxoimine, the mixture is heated to about 150° to 250° C. until the condensation reaction is complete, about 20 to 60 minutes, then the water soluble solvent is added.

For best results, the molar ratio of oxoimine to dianhydride should be in the 0.01:1 to 10:1 range. The higher proportions of oxoimine produce very flexible, low curing temperature coatings, while lower proportions of oxoimine produce coatings requiring higher temperature processing to achieve the desired properties. Generally, best results are obtained with ratios of oxoimine to dianhydride of about 1:1 to 6:1.

Any suitable solvent which is both water soluble and acts as a solvent for the bisimide may be used. Typical such solvents include ethylene glycol monoethyl ether, ethylene glycol monoethyl ether, ethylene glycol monobutyl ether, ethylene glycol monoethyl ether acetate, ethylene glycol monoethyl ether acetate, ethylene glycol monobutyl ether acetate, ethylene glycol monobutyl ether acetate ethylene glycol and mixtures thereof. Best results are obtained with ethylene glycol monobutyl ether and ethylene glycol monoethyl ether acetate. From about 2 to 20 moles solvent per mole oxoimine may be used with good results.

Sufficient water is then added to produce a solution having from about 10 to 80 wt. % water. Best results are obtained with and about 60 wt. % water solution.

Next, the selected aromatic diamine (or mixture of diamines) is added to the solution. Preferably, an approximately stoichiometric quantity of diamine is used.

Finally, to the mixture is added from about 2 to 20 wt. % of a tertiary amine based on the weight of water used. Best results are obtained with about 10 wt. % tertiary amine. The tertiary amine is used to stabilize the solution. Any suitable tertiary amine may be used. Typical such amines include N-methyl morpholine, triethyl amine, methyl pyridine and mixtures thereof.

Any suitable aromatic diamine may be used. Typical aromatic diamines include 4,4' p-Phenylenediisopropylidene bisaniline; 4,4' diamino diphenyl ether; 4,4' diamino diphenyl methane; 1,4 diamino benzene; 1,3 diamino benzene; 4,4' diamino diphenyl sulfone and mixtures thereof. Of these, best results are obtained with 4,4' diamino diphenyl ether and 4,4' diamino diphenyl methane which are, therefore, preferred. If desired, the aromatic diamines may have an aliphatic moiety in the molecule.

Additives to improve various characteristics of the final coating may be added as desired. Any appropriate additives may be used, such as fillers, pigments, fibers and surfactants. Typical surfactants include Dow Corning Corp. 190 or 193, FC430 from Minnesota Mining & Manufacturing Co., Zonyl FSC from E. I. dePont de Nemours & Co., and L550 from Union Carbide Corp. While any suitable concentration may be used, from about 0.01 to 2% (by weight, based on the weight of the solution prior to drying) is preferred. Of these surfactants, best results have been obtained with Zonyl FSC. Fillers and reinforcing additives may be added. Typical fillers include Kevlar aramid fibers, graphite fibers, glass fibers, carbon and graphite powders, Teflon fluorocarbon powders, metal powders and mixtures thereof.

The solution may be partially dried prior to application to the surfaces to be coated, if desired. Or, the solution may be coated onto of the surface to be coated, then partially dried to remove the solvents prior to curing the resin.

This composition may be used to coat any suitable surfaces by any suitable method. Smooth, flaw-free coatings may be formed, for example on aluminum, steel, titanium, glass and ceramics. Any suitable coating technique may be used to apply the composition, such as dip, spray, roller or brush coating.

The polymerization reaction which produces the coating is not fully understood. It appears to be an exchange reaction which produces a polyimide system with liberation of an amino carboxylic acid. The coating is cured by heat. Temperatures of from about 176.6° to 316° C. may be used over periods of about 5 to 60 minutes. The coating compositions of this invention may also be used to bond surfaces together. Basically, at least one of the surfaces is coated, the surfaces are brought together (with or without preliminary drying of the coating to a tacky consistency) and the polyimide is cured under heat and pressure. The coating composition may also be used to impregnate woven or matted high strength fiber fabrics, such as glass, graphite, aramid or boron fiber fabrics. The fabrics are preferably first impregnated with the solution, which is dried sufficiently to drive off residual solvent. The tacky fabric sheets are then stacked in a desired arrangement and shape, a pressure of about 20 to 100 psig is applied and the sheets are heated to about 230° to 320° C. for about 30 to 120 minutes to cure the polyimide resin. A well-consolidated composite structure results.

Details of the invention will be further understood upon reference to the following examples, which describe preferred embodiments of the methods and compositions of this invention. All parts and percentages are by weight, unless otherwise indicated.

EXAMPLE I

About 322.23 g. (1.0M) of 3,3',4,4'-benzophenonetetracarboxylic acid dianhydride (BTDA) and about 305 g. (2.7M) caprolactam are placed in a 2 liter flask, heated to about 200° C. and maintained at that temperature for about 30 min. The mixture is cooled to about 120° C. and about 400 g. of ethylene glycol monobutyl ether is added, the mixture is stirred until homogeneous and about 400 g. of water is added. The mixture is then cooled to just below about 45° C. and about 198.2 (1M) g. of 4,4'-diaminodiphenyl methane is added. The mixture is stirred for about 40 min. To the viscous liquid is added about 40 g. of N-methyl morpholine and the clear solution is stirred for about 20 min. at about 40° C. The liquid resin at this stage has about 40 wt. % solids content. The liquid resin is brushed on an aluminum plate and is dried in an air circulating oven at about 250° C. for about one hour, producing a dry, smooth, flexible coating. The coating is further heated at about 316° C. for about 20 min., producing a coating which is thermally stable and resistant to oils and solvents.

EXAMPLE II

The procedure of Example I is repeated with four additional samples, varying only the quantity of caprolactam. Where Example I used 305 g. (2.7M) caprolactam, to give a molar ratio of caprolactam to BDTA of about 2.7:1, the four additional tests use caprolactam quantities of about: II(a) 9 g. (0.08M, 0.08:1 ratio), II(b) 150 g. (1.3M, 1.3:1 ratio), II(c) 610 g. (5.4M, 5.4:1 ratio) and II(d) 1220 g. (10.8M, 10.8:1 ratio). The characteristics of the coating products in these tests are excellent overall for tests II(b) and II(c). This demonstrates that for best the ratio of oxoimine to aromatic dianhydride should be in the ratios between about 1:1 and 6:1.

EXAMPLE III

The procedures of Example I are repeated, except that in place of ethylene glycol monoethyl ether, the following solvents are used: II(a) ethylene glycol monobutyl ether, III(b) ethyleneglycol monoethyl acetate. In each case an excellent coating results.

EXAMPLE IV

The procedures of Example I are repeated, except that the following diamines are used in place of the 4,4'-diaminodiphenyl methane: IV(a) 1.4 diamino benzene (1.5M), IV(b) 4,4'-diaminodiphenyl sulfone (1.5M), IV(c) 4,4'diaminodiphenyl ether (1.5M), V(d) 4,4'-diaminodiphenyl methane (0.75M) and 4,4'-diaminodiphenyl methane (0.75M). In each case the coating has excellent characteristics, with some variation in properties among the sub-examples.

EXAMPLE V

The procedures of Example I are repeated with the only change being the substitution of the following oxoimines for the 2.7M caprolactam specified in Example I: V(a) 2-pyrrolidone (0.75M), V(b) 2-piperidone (0.75M), V(c) caprolactam (0.375M) and 2-piperidone (0.375M). The product in each case is an excellent coating, with slight changes in physical properties with the different oxoimines.

EXAMPLE VI

The procedures of Example I are repeated with three additional samples, changing only the tertiary amine used. These examples use: VI(a) triethyl amine and VI(b) methyl pyridine. These tertiary amines both give good results.

EXAMPLE VII

The procedures of Example I are repeated, except that in place of the BTDA the following dianhydrides are used: VII (a) pyromellitic dianhydride (218 g., 1M) and VII(b) BTDA (161.1 g., 0.5M) and butane tetracarboxylic acid dianhydride (100 g., 0.5M). Again, excellent coatings result.

EXAMPLE VIII

Example I is repeated, except that the BTDA, caprolactam, ethylene glycol monobutyl ether and water are all placed together in the flask and reacted at about 100° C. for about 70 min. The diamine and tertiary amine are then added as detailed in Example I. An excellent coating is produced.

Although specific components, proportions and conditions have been specified in the above examples, these may be varied with similar results, where suitable. In addition, other materials may be added to the resin material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. The method of preparing a polyimide coating composition which comprises the steps of:
   mixing an aromatic dianhydride with an oxoimine having the general formula:

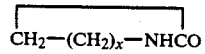

where x is an integer from 4 to 7 in a mole ratio of oxomine to dianhydride between about 0.01:1 and 10:1 to produce a carboxy terminated bisimide; dissolving said imide in a solvent which renders the resulting solution water soluble;
   adding sufficient water to make at least a 10 wt. % water solution adding thereto aromatic diamine; and adding thereto from about 2 to 20% of the weight of the water of a tertiary amine.

2. The method according to claim 1 wherein said solvent is selected from the group consisting of ethylene glycol monoethyl ether, ethylene glycol monoethyl ether, ethylene glycol monobutyl ether, ethylene glycol monoethyl ether acetate, ethylene glycol monoethyl ether acetate, ethylene glycol monobutyl ether acetate ethylene glycol and mixtures thereof.

3. The method according to claim 1 wherein said solvent is ethylene glycol monobutyl ether or ethylene glycol monoethyl ether acetate.

4. The method according to claim 1 wherein said aromatic dianhydride is either 3,3',4,4'-benzophenone tetracarboxylic acid dianhydride, pyromellitic dianhydride or a mixture thereof.

5. The method according to claim 1 wherein said aliphatic dianhydride is 1,2,3,4-butanetetracarboxylic acid 6. The method according to claim 1 wherein said oxoimine is caprolactam.

7. The method according to claim 1 wherein the number of moles of diamine is substantially equal to the moles of dianhydride.

8. The method according to claim 1 wherein said diamine is 4,4'-diaminophenyl ether or 4,4'-diaminodiphenyl methane.

9. The method according to claim 1 wherein said tertiary amine is N-methyl morpholine, triethyl amine or a mixture thereof.

10. The method according to claim 1 wherein up to about 50 mole % of said dianhydride is an aliphatic dianhydride.

11. The method according to claim 1 wherein at least some of said aromatic diamine has an aliphatic moiety in the molecule.

12. An imide coating composition comprising a mixture of:
    an oxoimine having the general formula

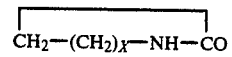

where X is an integer from 4 to 7;
    from about 0.1 to 10.0 moles of a dianhydride per mole of oxoimine;
    from about 2 to 20 moles of a water soluble solvent per mole of oxoimine;
    an aromatic diamine present in a molar quantity substantially equal to the sum of the moles of said dianhydride;
    sufficient water to produce a solution having from about 10 to 80 wt. % water; and
    a tertiary amine in a quantity equal to about 2 to 20% of the weight of the water.

13. The composition according to claim 12 wherein said water soluble solvent is selected from the group consisting of ethylene glycol monoethyl ether, ethylene glycol monoethyl ether, ethylene glycol monobutyl ether, ethylene glycol monoethyl ether acetate, ethylene glycol monoethyl ether acetate, ethylene glycol monobutyl ether acetate, ethylene glycol and mixtures thereof.

14. The composition according to claim 12 wherein sai tertiary amine is selected from the group consisting of N-methyl morpholine, triethyl amine, methyl pyridine and mixtures thereof.

15. The composition according to claim 12 wherein said dianhydride is 3,3',4,4'-benzophenone tetracarboxylic acid dianhydride, pyromellitic dianhydride or mixtures thereof.

16. The composition according to claim 12 wherein said oxoimine is caprolactam.

17. The coating according to claim 12 wherein said aromatic diamine is selected from the group consisting of 4,4' p-Phenylenediisopropylidene bisaniline; 4,4' di-amino diphenyl ether; 4,4' diamino diphenyl methane; 1,4' diamino benzene; 1,3' diamino benzene; 4,4' diamino diphenyl sulfone and mixtures thereof.

18. The composition according to claim 12 wherein said dianhydride is a mixture of an aromatic dianhydride and an aliphatic dianhydride with up to about 50 mole % of said mixture being the aliphatic dianhydride.

19. A method of producing a polyimide coating which comprises the steps of:
    applying a substantially uniform coating of the composition of claim 1 to a surface;
    heating said coating to a temperature of from about 176.6° to 316° C. for from about 5 to 60 min.

20. The method according to claim 19 further including a step prior to said heating step of drying said coating by heating said coating to a temperature of from about 90° to 150° C. for from about 10 to 60 minutes.

* * * * *